J. C. GARROTT.
FLOAT VALVE.
APPLICATION FILED JAN. 23, 1915.

1,150,513.

Patented Aug. 17, 1915.

Witnesses
J. Milton Jester
C. Everett

Inventor
John C. Garrott
By D. A. Gourick
Attorney

UNITED STATES PATENT OFFICE.

JOHN COLLIER GARROTT, OF HOUSTON, TEXAS.

FLOAT-VALVE.

1,150,513.   Specification of Letters Patent.   Patented Aug. 17, 1915.

Application filed January 23, 1915. Serial No. 3,950.

*To all whom it may concern:*

Be it known that I, JOHN COLLIER GARROTT, a citizen of the United States, residing at Houston, in the county of Harris and State of Texas, have invented certain new and useful Improvements in Float-Valves, of which the following is a specification.

This invention relates to float valves adapted for maintaining a constant level of liquid within a receptacle, and has for its object the provision of a float valve structure having a float supported lever connected with a reciprocable valve by a peculiar connection whereby the use of slots and links is eliminated and whereby the arcuate movement of the actuating lever is compensated for to alloy relative movement of the connection to prevent binding of the valve stem.

Figure 1:
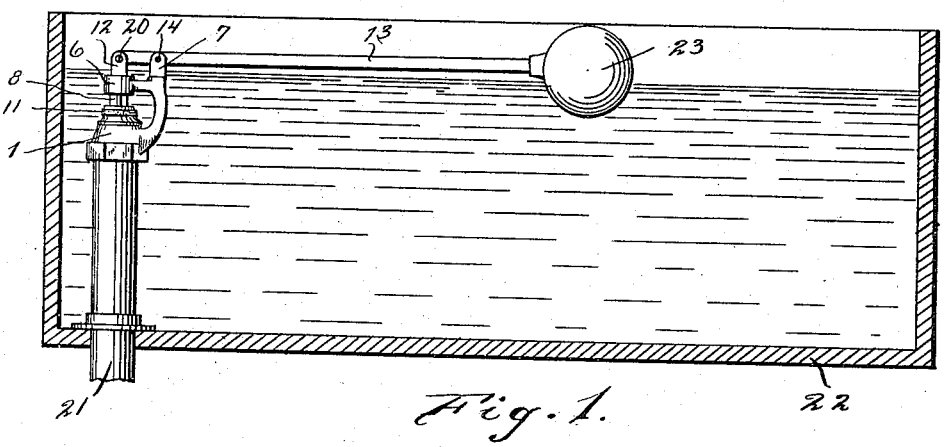
Figure 2:
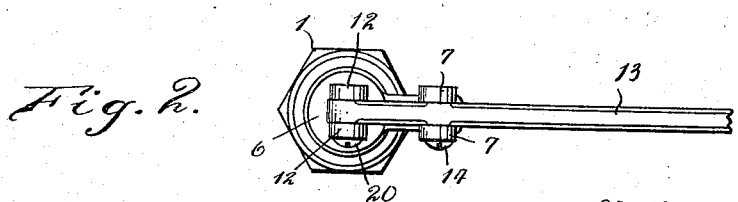
Figure 3:
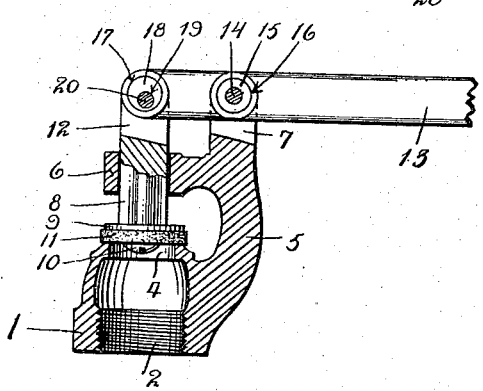
Figure 4:
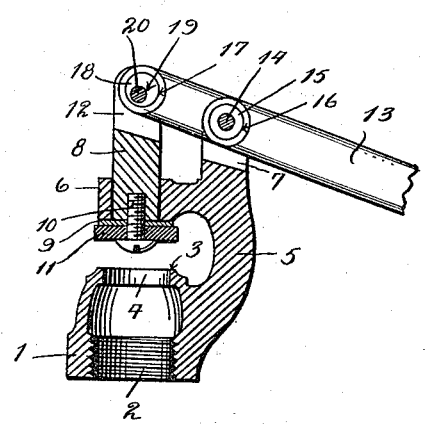

With this and other objects and advantages in view such as extreme simplicity, cheapness, durability, efficiency and the general improvement of the art, the invention consists in the novel construction and arrangement of parts to be hereinafter more fully described, and illustrated in the accompanying drawings, in which:

Figure 1 is a view of my invention in position within a watering tank, Fig. 2 is a top plan view of the valve structure, Fig. 3 is a vertical sectional view through the valve structure in its closed position, and Fig. 4 is a similar view showing the valve open.

Referring more particularly to the drawings, the numeral 1 designates the hollow body portion of the valve which is internally threaded as shown at 2 for engagement with a pipe and which is provided at its top with an annular seat 3 surrounding the discharge opening 4. Formed integrally upon the body portion 1 is an upwardly extending arm 5 having a laterally extending guide sleeve 6 thereon the bore of which is coaxial with the discharge opening 4. The upper end of the arm 5 is bifurcated as shown to provide ears 7.

The valve for opening or closing the discharge opening 4 comprises a stem 8 carrying at its lower end a disk 9 to which is secured by a screw 10 or other suitable means a leather or rubber washer 11 adapted to engage upon the seat 3. The upper end of the stem 8 is bifurcated as shown to form spaced ears 12.

The valve is operated by a lever 13 pivoted between the ears 7 and connected with the ears 12. The pivotal connection between the ears 7 comprises a screw or bolt 14 passing through the ears 7 and centrally through a roller 15 disposed within an opening 16 in the lever 13. This particular connection practically eliminates friction and greatly facilitates the swinging of the lever.

It will be obvious that when the lever 13 is moved to operate the valve, the stem 8 would bind within the sleeve 6 unless provision were made for allowing the point of connection of the lever with the valve to shift relatively to the lever as it describes an arc. In order to accomplish this I provide the lever 13 with an opening 17 within which is revoluble a roller 18 having a hole 19 formed eccentrically therein. A screw 20 passes through the ears 12 and through the hole 19. When the device is assembled, the roller 18 is disposed so that the hole 19 is disposed in its lowermost position as shown in Fig. 3 of the drawings.

The device is adapted for many uses, though I have shown it in Fig. 1 as applied to the inlet pipe 21 of a watering trough or other tank 22. The lever 13 is of course provided with a float 23. When the level of the water in the tank drops, the lever 13 will drop, thus elevating the valve stem 8 and allowing more water to flow in. When the long end of the lever 13 drops, and the short end rises, the roller 18 will rotate within the opening 17, whereupon the eccentricity of the hole 19 will allow the screw 20 to maintain its position without exerting a lateral strain which would cause binding. When the long end of the lever rises on account of the inflow of water and the short end drops, the reverse movement occurs.

From the foregoing description and a study of the drawings, it will be apparent that I have thus provided a float valve in which the valve stem can not bind and which will be consequently easy in operation.

Having thus described my invention what I claim is:

1. In a float valve structure comprising a body portion having a discharge opening surrounded by a valve seat and having a reciprocable valve engageable upon said seat, an upwardly extending arm on said body portion having a guide arm integral therewith for guiding the stem of the valve, said upwardly extending arm having its upper end bifurcated to form ears, a lever pivoted between said ears and connected with said valve, said connection comprising a roller revoluble in said lever and provided with an eccentric opening, and a pivot passing through said opening and engaging the stem of said valve, said eccentric opening being disposed in its lowermost position when said valve is in its closed position.

2. In a float valve structure comprising a body portion having a discharge opening surrounded by a valve seat and having a reciprocable valve engageable upon said seat, and an upwardly extending arm on said body portion having a guide arm integral therewith for guiding the stem of the valve, said upwardly extending arm having its upper end bifurcated to form ears having holes therein, a lever pivoted between said ears by a roller bearing pivot, said pivot comprising a roller revoluble in said lever and provided with a centrally located hole, and a pin passing through said hole, said lever being further connected with the stem of said valve, said connection comprising a roller revoluble in said lever and provided with an eccentric opening, and a pivot passing through said opening and engaging the stem of said valve, said eccentric opening being disposed in its lowermost position when said valve is in its closed position.

3. In a float valve comprising a body portion having a valve seat therein and a reciprocable valve engageable upon said seat, a lever pivoted to said body portion by a roller bearing pivot, said pivot comprising a roller revoluble in said lever and provided with a centrally located hole, and a pin passing through said hole and engaging said body portion, said lever being further connected with the stem of said valve, said connection comprising a roller revoluble in said lever and provided with an eccentric opening, and a pivot passing through said opening and engaging the stem of said valve, said eccentric opening being disposed in its lowermost position when said valve is in its closed position.

In testimony whereof I hereto affix my signature in the presence of two witnesses.

JOHN COLLIER GARROTT.

Witnesses:
C. A. LEWIS,
H. Y. HOUZE.

Copies of this patent may be obtained for five cents each, by addressing the "Commissioner of Patents, Washington, D. C."